Dec. 26, 1961   H. A. MAUCH   3,014,348
AIR SOURCE APPARATUS
Filed Feb. 26, 1959
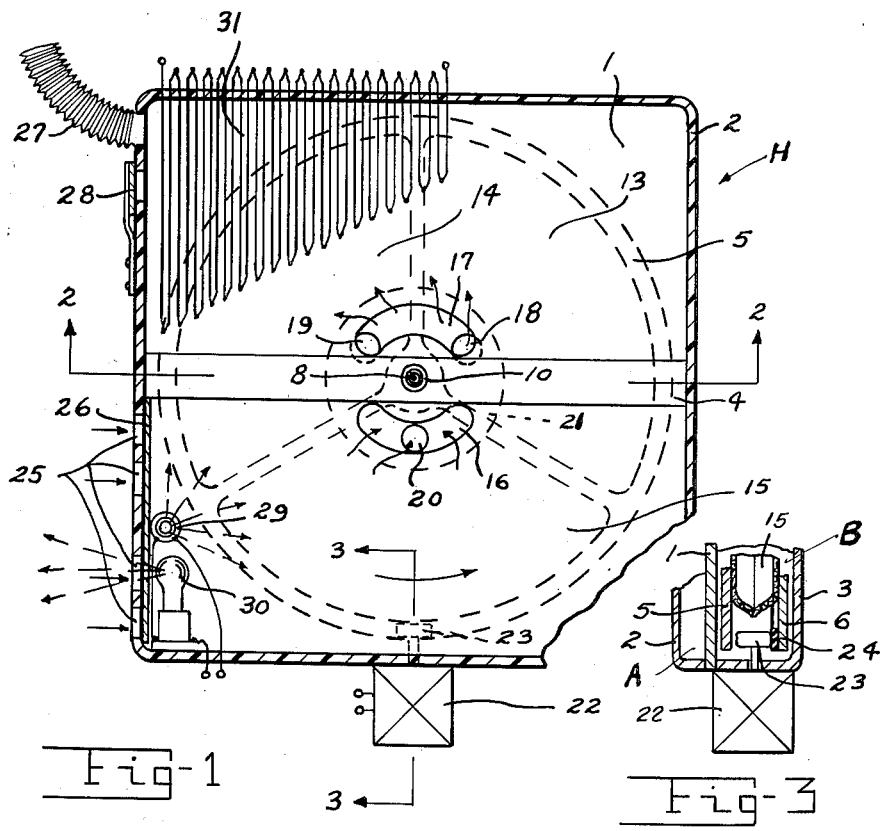
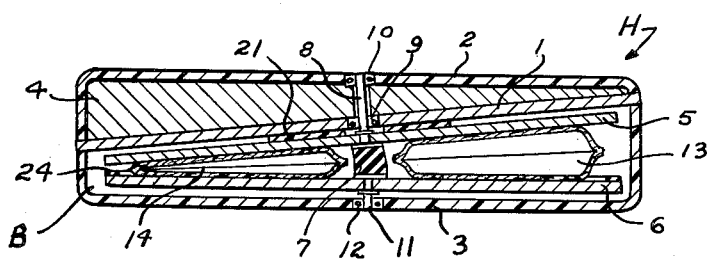
INVENTOR.
HANS A. MAUCH
BY
Jerome P. Bloom
ATTORNEY United States Patent Office 3,014,348
Patented Dec. 26, 1961

3,014,348
AIR SOURCE APPARATUS
Hans A. Mauch, 429 Judith Drive, Dayton 29, Ohio
Filed Feb. 26, 1959, Ser. No. 795,669
13 Claims. (Cl. 62—3)

This invention relates to novel air source apparatus particularly adaptable for ventilating and air conditioning.

There are many systems and applications requiring apparatus capable of producing a pressured flow of air. The prior art has produced simple fans and air compressors of various nature for this purpose. Fans have limited pressure capabilities, low efficiency, and are quite noisy, even at moderate pressures. Moreover, they tend to heat the air they deliver due to their low efficiency. The average air compressor has limited volume flow capabilities, is bulky, expensive in proportion to its output, noisy and the air delivered thereby is generally contaminated by lubricant particles.

There has been an absence of economical air source apparatus capable of operating effectively and efficiently in intermediate ranges where the pressure demand is greater and the efficiency is higher than a simple fan can supply and a conventional air compressor is unnecessary and undesirable, either from the standpoint of bulk, noise, cost or air contamination. Devices of this nature have been sought for some time but no satisfactory solution has occurred prior to the present invention.

The present invention provides novel air source apparature which is relatively compact, inexpensive, essentially noiseless, free of lubricant particles and highly efficient through a wide range of operation. Above and beyond this, the invention provides an improved air source apparatus which can simply and economically provide a pressured flow of air which can be filtered, purified and heated or cooled, as desired.

A primary object of the invention is to provide novel air source apparatus which may be economically fabricated, more efficient and satisfactory in use, adaptable to a wide variety of applications and unlikely to malfunction.

A further object of the invention is to provide highly efficient air source apparatus which is essentially noiseless in operation.

Another object of the invention is to provide novel air source apparatus in a compact package which is simple to fabricate.

An additional object of the invention is to provide novel air source apparatus particularly desirable for applications where simple fans are inadequate and expensive or bulky compressor equipment is undesirable.

A further object of the invention is to provide air source apparatus novelly incorporating noiselessly operating means for selectively heating or cooling air delivered thereby.

Another object of the invention is to provide improved air source apparatus novelly incorporating a simple and safe medium for selectively heating or cooling the air delivered thereby.

A further object of the invention is to provide a highly efficient air source apparatus which will inherently quietly provide a clean, cool, pressured flow of air.

Another object of the invention is to provide improved air source apparatus having automatic compensating features maintaining its efficiency at a maximum at variable loads whereby to give the apparatus extended operating life at maximum efficiency.

An additional object of the invention is to provide novel air source apparatus which is economical to operate and particularly adapted for ventilation, air conditioning and other commercial purposes.

Another object of the invention is to provide air source apparatus possessing the advantageous structural features, the inherent meritorious characteristics and the means and mode of operation herein described.

With the above primary and other incidental objects in view which will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein is illustrated a preferred but not necessarily the only form of embodiment of the invention, FIG. 1 shows an embodiment of the invention with its cover removed;

FIG. 2 is a cross-sectional view taken on line 2—2 of FIG 1; and

FIG. 3 is a cross-sectional view taken on line 3—3 of FIG. 1.

The illustrated embodiment will be particularly described herein with reference to its application for producing a variable pressured flow of conditioned air. It should be readily apparent therefrom, to those versed in the art, that the embodiment and application of the invention is not so limited. Such is not intended. Other embodiments and applications of the inventive subject matter herein should be readily obvious to those versed in the art.

The air source apparatus shown includes a mounting plate 1 having its peripheral edge confined between the mating edges of upper section 2 and lower section 3 of a generally rectangular housing H. The configuration of the housing sections is such that plate 1 extends generally diagonally from one side of the housing to another and forms wedge-shaped chambers A and B with the top section 2 and the bottom section 3 respectively. A shaft 8 extends perpendicularly to plate 1 through axially aligned bearings 9 and 10 respectively fixed in the plate 1 and the top portion of the housing section 2. The axis of the shaft 8 is thereby at an inclination to the central vertical axis of the housing. The innermost end of the shaft 8 extends through bearing 9 into the housing chamber B. A relatively thin annular elastic seal 21 is fixed to the surface of plate 1 within chamber B about bearing 9 and shaft 8 and a large disc 5 fixed to the inner extremity of shaft 8 extends parallel to plate 1 with one surface in contacting relation to the inner face of elastic seal 21.

A shaft 11 has one end mounted in a bearing 12 fixed centrally of housing section 3 to extend vertically therefrom in the chamber B. Disc 6 is fixed to the innermost end of shaft 11 in parallel closely spaced relation to the bottom of the housing H. This establishes a space between relatively separated discs 5 and 6 which is generally wedge-shaped in cross-section.

It should be understood that the terms "top" and "bottom" as used herein are purely with reference to the structure as shown in the drawings. The described apparatus can operate equally as well in any position.

The relatively adjacent innermost extremities of the shafts 8 and 11 are connected through discs 5 and 6 by a universal type connector 7 in the nature of a cylindrical section of rubber which has the added capability of accommodating lateral shifting of the discs that might occur in the operation of the air source apparatus. Three sealed envelopes providing bellows 13, 14, and 15 in the form of sections of an annulus are in circularly spaced relation about connector 7 between the discs 5 and 6. The bellows have their opposite outer surfaces, except for peripheral edge portions, suitably fixed to the respective discs. Due to the wedge shape of the space provided between the discs 5 and 6, as mounted, it will be seen from FIG. 2 of the drawings that when the bellows are in one-half of the space between the discs, they are relatively compressed and while they are in the other half, they are expanded. Each of the bellows 13, 14 and 15 have single openings, respectively designated as 18, 19 and 20, adjacent the innermost portions of their periphery and in their side adjacent the disc 5. The openings 18, 19 and 20 are thereby established in circularly spaced relation about the center of disc 5 opposite the seal 21. Similar openings are provided in the disc 5 in alignment with the openings in the bellows.

A divided plate 4 extends across the center of chamber A of housing H, connecting to the mounting plate 1 and the housing section 2 to divide the space defined thereby into two equal sections which are sealed from each other. The shaft 8 extends through the center of the divider plate 4. At diametrically opposed positions, to either side of the plate 4, the elastic seal 21 and the mounting plate 1 are provided with aligned, identical kidney shaped apertures 16 and 17. The openings 18, 19 and 20 define a path opposite the openings 16 and 17. As may be seen from FIG. 1 of the drawings, on rotation of the discs 5 and 6, the openings in the bellows successively communicate with chamber A to either side of the divider plate 4 through the respective openings 16 and 17.

The peripheral portion of the surface of the disc 6 most adjacent the disc 5 has an annular strip 24 of friction lining imposed thereon for purposes to be further described.

As shown, a motor 22 is fixed to one side of the housing H adjacent the chamber B and on a line at right angles to the divider plate 4. The drive shaft of the motor extends through the wall of the housing to mount a drive wheel 23 to its inner end so as to have a very moderate frictional engagement with friction element 24 on disc 6 and be substantially spaced from disc 5. This is the means whereby the discs 5 and 6 and connected bellows are driven.

Air inlet openings 25 are provided in the side wall of housing section 2 to one side of the divider 4 in communication with the kidney shaped opening 16 in plate 1. A filter 26 overlies the inner surface of the side wall section having the openings 25. The same side wall section of housing section 2 to the other side and remote from the divider 4 has an outlet opening into which an air hose 27 is connected. The hose 27 may lead to a bed ventilating unit for example, or other such equipment for supplying conditioned air thereto. The wall of the housing section 2 adjacent the air exit hose has a relief aperture normally covered by a plate type relief valve 28 consisting of a plate type spring arm secured at one end to the housing having a sponge rubber pad on its other end adapted to normally overlie and seal the relief aperture. An ozone lamp 29 is mounted in chamber A adjacent the air inlets 25 in the general path of air entering the chamber therethrough. A ballast lamp 30 is mounted in housing section 2 adjacent the lamp 29 which conventionally enables the lamp 29 to properly function and also sends illuminating rays to the area adjacent the housing through apertures 25.

Mounted to the plate 1 in chamber A and adjacent the air exit hose 27, in the path of air delivered thereto, is a selective heating or cooling unit 31. The unit 31 consists, as shown, of electrically conductive elements in parallel spaced relation which are alternately of different substance and series connected to provide succesive junctions of adjacent ends of elements of different substance. The elements may take any form such as rod, ribbon or wire, etc. In certain instances it may be desirable that more than two different electrically conductive substances be series connected in forming the unit 31, but this will be dependent on the application of the apparatus. In any case, the elements are disposed relative the housing H to provide junctions alternately within the housing section 2 and outside the housing in the unit illustrated. The unit 31 in this way utilizes a Peltier effect in operation. Depending on the direction that current is passed through the unit 31, by suitable external controls, the junctions inside the housing adjacent the air exit hose will be either cold or hot while the opposite condition will exist simultaneously in the junctions outside the housing. It will be seen that a very simple and economical means is thus provided for selectively heating or cooling the air delivered to the air exit hose 27. It is safe and noiseless in operation.

An illustrative embodiment of the invention is thus provided which functions as follows. For example, the housing H may be placed under a bed for connection to a bed cover ventilating unit. Suitable controls are provided to operate the equipment but need not be detailed since they are conventional. The motor 22 is actuated to drive the disc 6 through the medium of the wheel 23 engaging the friction element 24. Since the discs are connected by the bellows and the joint 7, the whole assembly thus provided is caused to rotate. As the discs rotate, their relative inclination causes the bellows 13, 14 and 15 to be successively compressed and expanded. The direction of rotation is such (as indicated by the arrow in FIG. 1) that the bellows are expanding when in communication with the chamber A through openings 16 and compressing when in communication with chamber A through opening 17. In the one case the expanding bellows sucks in air through opening 16, drawing air through the air inlets 25, filter 26 and past the purifying ozone lamp 29. As the bellows moves with the rotating discs, the opening therein moves from communication with opening 16 to be sealed by the seal 21 until the opening in the bellows moves to the opening 17. The bellows is being compressed as its opening is communicating with chamber A through opening 17 due to the convergence of the containing discs at this point. The compression of the bellows exhausts the air which was taken from chamber A to one side of the divider 4 to the chamber A to the other side of the divider 4 driving it through the opening 17 and the air exit hose 27 over the unit 31. Depending on the direction of current impressed by suitable controls through the unit 31, the air can be heated or cooled to varying degree as it travels to the hose 27. The use of the plurality of circularly arranged bellows which successively function within a cycle of rotation results in a substantially non-pulsating flow of air through the air exit hose. The operation of the apparatus is substantially noiseless. The operating components are so simply and effectively related that there is little to generate undesirable noise.

A feature of the invention apparatus is the self compensating nature of the drive of the bellows assembly through the wheel 23 which under no load has a very moderate frictional engagement to disc 6. The position of the wheel 23 with regard to the relative inclination of the discs 5 and 6 and their direction of rotation is such that the nature of the pressure produced by compression of the bellows is directly reflected in the pressure of engagement of the disc 6 to the wheel 23. Thus, with increase in pressure developed in the bellows due to overcoming an outside air pressure the frictional engagement of wheel 23 to liner 24 on disc 6 is similarly increased. In this way there can be no slipping in the drive mechanism. As a result, there is minimum wear of component structure and a substantial saving in energy necessary to operate the apparatus. The use of the universal type joint which permits the accommodation of lateral force effects within the disc assembly makes the assembly more durable and efficient and aids the objective of noiseless operation.

The compact nature of the assembly of the unit is a feature worth notice. By the particular arrangement provided, the housing need not have a depth of much more than five inches to provide a substantial high efficiency output and to adapt to a wide range of application. Also, when the unit housing is placed under a bed, for example, it can even illuminate adjacent areas through the air inlet openings.

Various fundamental improvements in structure and function of air source apparatus is thus provided. The low energy loss in operating invention apparatus renders it highly efficient and economical. Also, the unique application of the Peltier effect is believed significant in the art. The unit provided can operate in any position.

A most significant aspect of the invention is that for the first time it is possible to provide commercial air conditioning units capable of controlled heating and cooling that are not only compact and substantially noiseless, but also completely safe. The prescribed use of the Peltier effect in air conditioning equipment eliminates the conventional need for gases which are dangerous or have undesirable odors. The fact that the bellows transfer produces no undesirable heating effect on the air also enables better and more uniform temperature control. Thus the invention provides definite advance in the art.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of their advantages.

While in order to comply with the statute the invention has been described in language more or less specific as to structural features, it is to be understood that the invention is not limited to the specific features shown but that the means and construction herein disclosed comprise but one of several modes of putting the invention into effect.

Having thus described my invention, I claim:

1. Air source apparatus including bellows means having a single aperture mounted for rotation about an axis, a pair of flat relatively inclined plates confining said bellows means to cause successive timed expansion and contraction thereof on rotation, air inlet means, air outlet means, means for selectively opening and closing the aperture in said bellows means whereby to provide direct communication between said inlet means and bellows means on expansion of the bellows means and between said outlet means and said bellows means on compression of the bellows means.

2. Air source apparatus including rotating bellows having a single aperture, a relatively fixed element overlying and in normally sealing relation to the bellows aperture, said fixed element having a plurality of openings successively aligning with the bellows aperture as it rotates, means defining an air inlet communicating with one of said openings, means defining an air outlet communicating with another of said openings and means successively expanding and compressing said bellows in timed relation to the bellows aperture communicating first with one and then the other of said openings whereby air is drawn from said inlet means and exhausted to said outlet means on rotation of said bellows.

3. Air source apparatus including a plurality of circularly arranged envelopes, a pair of plates fixedly connected to opposite sides of said envelopes except for peripheral portions thereof, valving means connected with said envelopes, peripherally engaged means for cyclically driving at least one of said plates normally having a light frictional engagement therewith, said plates operating to effect alternate and successive expansion and compression of said envelopes for successively taking air into said envelopes through said valving means and exhausting air through said valving means whereby to provide a substantially noiseless non-pulsating delivery of air said drive means being adapted to automatically increase or decrease its frictional engagement to said one plate proportionally to compression pressure exerted on said envelopes.

4. Air source apparatus including a pair of rotatably mounted discs, means maintaining said discs relatively inclined as they rotate, a universal coupling for said discs formed to accommodate lateral shifting thereof, bellows connected to said discs and confined therebetween for rotation therewith, a single aperture in each of said bellows, apertures in one of said discs aligned with the apertures in said bellows, valving means controlling the openings in said bellows, said bellows being successively expanded and compressed on rotation of the discs, and said valving means being operatively related to the openings in said bellows to provide for intake of air as the bellows are expanded and exhaust of air as the bellows are compressed.

5. Air source apparatus including a pair of rotatably mounted discs, means maintaining said discs relatively inclined as they rotate, a universal type coupling for said discs, bellows connected to said discs and confined therebetween for rotation therewith, apertures in said bellows, apertures in one of said discs aligned with the apertures in said bellows, valving means controlling the apertures in said bellows, said bellows being successively expanded and compressed on rotation of the discs, and said valving means being operatively related to the apertures in said bellows to provide for intake of air as the bellows are expanded and exhaust of air as the bellows are compresesd and drive means functionally related to one of said discs, said one disc responding to compression pressure to produce a drive friction proportional to load produced on said apparatus thereby.

6. Air source apparatus comprising a flat disc mounted for rotation about an first axis, a second flat disc mounted for rotation about an axis angularly inclined to said first axis a resilient universal type joint centrally connecting said discs adapted to accommodate lateral shift thereof, bellows circularly spaced about said joint having opposite surfaces connected to said discs to provide a rotatable bellows assembly, said bellows being apertured for intake and exhaust of air whereby on rotation of said assembly said bellows will be successively expanded and compressed for intake and subsequent exhaust of air therefrom.

7. Air source apparatus comprising a disc mounted for rotation about an first axis, a second disc mounted for rotation about an axis angularly inclined to said first axis, a resilient universal type joint centrally connecting said discs, bellows circularly spaced about said joint having opposite surfaces connected to said discs to provide a rotatable bellows assembly, said bellows being apertured for intake and exhaust of air whereby on rotation of said assembly said bellows will be successively expanded and compressed for intake and subsequent exhaust of air therefrom and a drive means frictionally engaged in driving relation to one of said discs, so positioned relative the inclination and direction of rotation of said discs that the drive friction will be directly proportional to the pressure developed in compression of said bellows.

8. Air source apparatus including a housing, a plant inclined to said housing forming two wedge-shaped chambers therein, a disc rotatably mounted in one chamber about an first axis perpendicular to said plate, a second disc rotatably mounted in said one chamber about an axis inclined to said first axis, a universal joint having lateral resiliency centrally connecting said discs, bellows circularly spaced about said joint and between said discs whereby on rotation of said discs said bellows will be successively expanded and compressed a seal between said plate and said first disc, kidney shaped apertures in said plate and seal, divider means separating the other chamber into an air inlet and an air exit section apertures in said bellows and said first disc successively communicating with said air inlet and air exit sections through the kidney shaped apertures on rotation thereof respectively on expansion and compression of the bellows.

9. Air conditioning apparatus including a housing, a plate inclined to said housing forming two wedge-shaped chambers therein, a disc rotatably mounted in one chamber about a first axis perpendicular to said plate, a second disc rotatably mounted in said one chamber about an axis inclined to said first axis, a universal joint centrally connecting said discs, bellows means about said joint between said discs to be successively expanded and compressed by rotation of said discs, means defining openings in said plate, divider means in the other chamber forming an air inlet and an air outlet section, apertures in said bellows and said first disc providing successive communication with said air inlet and exit sections through said openings on rotation of said discs and means connected in said housing adapted to selectively produce a heating or cooling of air passing therethrough.

10. An air conditioning package including a housing, revolvable bellows in said housing, means operatively connected to cause said bellows to expand and compress as they revolve, friction drive means for revolving said bellows, said housing having means for communication with said bellows as they are compressed to deliver air under pressure therefrom and noiseless means for selectively heating or cooling the air delivered therefrom.

11. Air-conditioning apparatus comprising a shallow housing, bellows means defining at least one chamber having an aperture communicating therewith mounted for rotation in said housing, mounting means for said bellows means in one portion of said housing to cause successive expansion and compression of said chamber as the bellows means rotates, said mounting means including spaced openings arranged to successively align with the aperture communicating with said chamber as said bellows means rotates, means defining an air inlet to said housing communicating with one of said spaced openings and an air outlet communicating with another of said spaced openings whereby the aperture communicating with said chamber will align first with one then said another of said openings whereby air is drawn from said air inlet to said chamber and exhausted to said outlet.

12. Air-conditioning apparatus comprising a shallow housing, bellows means defining at least one chamber having an aperture communicating therewith mounted for rotation in said housing, mounting means for said bellows means in one portion of said housing to cause successive expansion and compression of said chamber as the bellows means rotates, said mounting means including spaced openings arranged to successively align with the aperture communicating with said chamber as said bellows means rotates, means defining an air inlet to said housing communicating with one of said spaced openings and an air-outlet, communicating with another of said spaced openings whereby the aperture communicating with said chamber will align first with one then said another of said openings whereby air is drawn from said air inlet to said chamber and exhausted to said outlet and noiseless means connected in another portion of said housing in the path of air moved to and through the bellows means operative to selectively heat or cool the air as required.

13. An air conditioning unit including a housing having means defining an input chamber, and an output chamber, rotatable bellows means arranged to selectively communicate with said chambers on rotation thereof to draw air from said input chamber and exhaust it to said output chamber, means providing a peripheral drive for rotation of the bellows means and noiseless means connected in one of said chambers operable to selectively heat or cool the air passing therethrough whereby to produce an air conditioning unit which is essentially noiseless in operation.

References Cited in the file of this patent
UNITED STATES PATENTS

| | | |
|---|---|---|
| 413,136 | Dewey | Oct. 15, 1889 |
| 1,193,467 | Mills | Aug. 1, 1916 |
| 1,422,550 | Egerton | July 11, 1922 |
| 2,249,806 | Bogoslowsky | July 22, 1941 |
| 2,346,236 | Rose | Apr. 11, 1944 |
| 2,708,351 | Gensheimer | May 17, 1955 |